No. 743,340. PATENTED NOV. 3, 1903.
P. SIMUNDT.
DISINFECTING APPARATUS.
APPLICATION FILED APR. 16, 1903.
NO MODEL. 3 SHEETS—SHEET 1.

WITNESSES
H. M. Kuehne
M. Ida Welch

INVENTOR
Percy Simundt.
BY Richards
ATTORNEYS

No. 743,340. PATENTED NOV. 3, 1903.
P. SIMUNDT.
DISINFECTING APPARATUS.
APPLICATION FILED APR. 16, 1903.
NO MODEL. 3 SHEETS—SHEET 2.
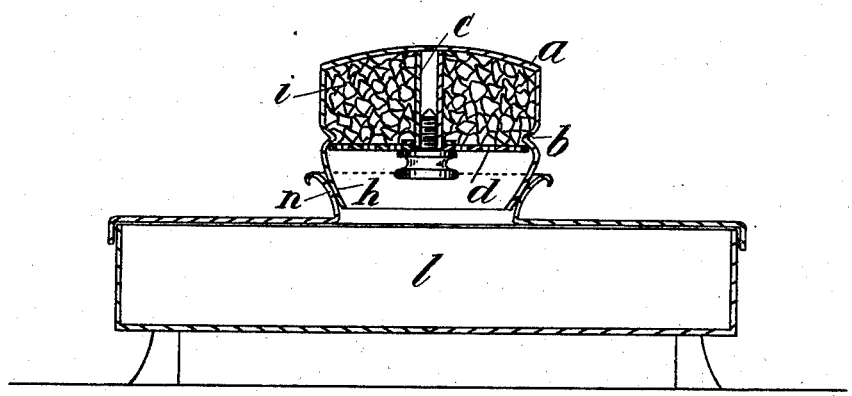
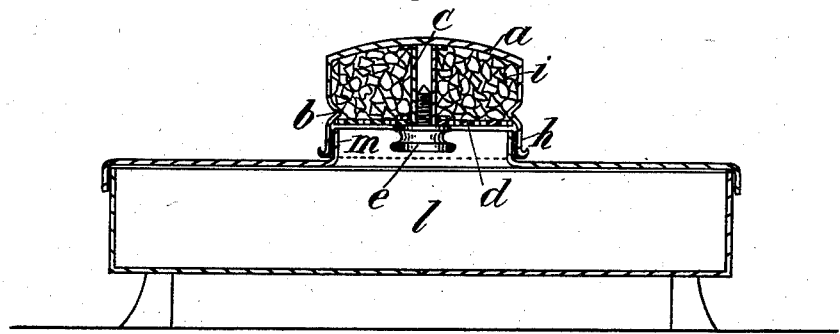

No. 743,340. PATENTED NOV. 3, 1903.
P. SIMUNDT.
DISINFECTING APPARATUS.
APPLICATION FILED APR. 16, 1903.
NO MODEL. 3 SHEETS—SHEET 3.
Fig. 6.
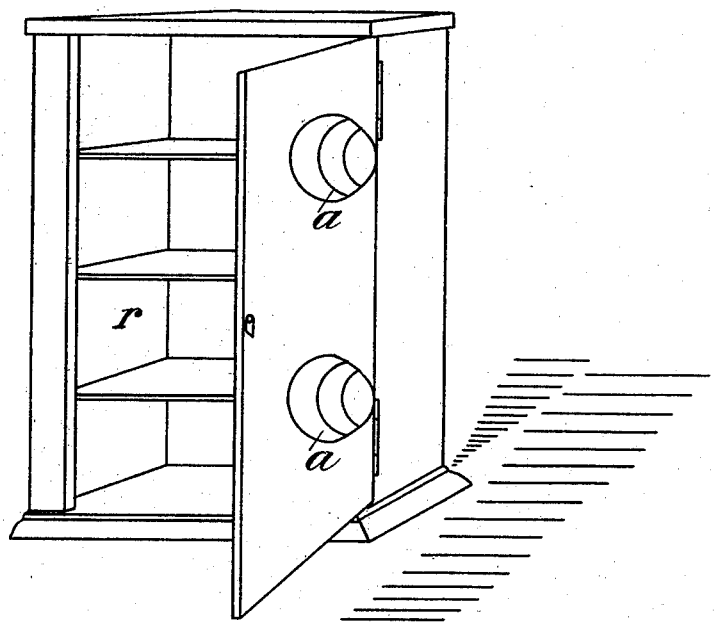
Fig. 7.
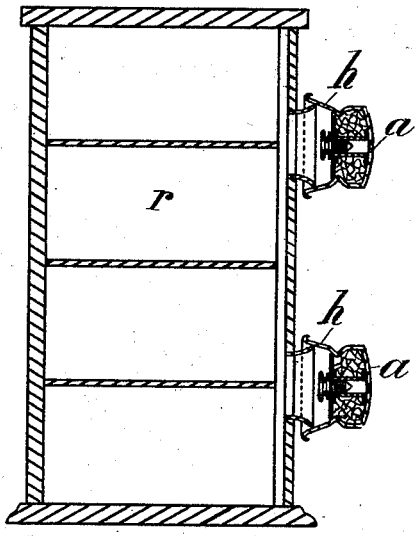
WITNESSES
H. M. Kuehne
M. Ida Welch
INVENTOR
Percy Simundt
BY 
ATTORNEYS No. 743,340. Patented November 3, 1903.

UNITED STATES PATENT OFFICE.

PERCY SIMUNDT, OF CHARLOTTENBURG, NEAR BERLIN, GERMANY.

DISINFECTING APPARATUS.

SPECIFICATION forming part of Letters Patent No. 743,340, dated November 3, 1903.

Application filed April 16, 1903. Serial No. 152,883. (No model.)

*To all whom it may concern:*

Be it known that I, PERCY SIMUNDT, manufacturer, a subject of the Emperor of Germany, residing at Charlottenburg, near Berlin, in the Empire of Germany, (whose full postal address is 8 Nürnbergerstrasse, Charlottenburg aforesaid,) have invented certain new and useful Improvements in Disinfecting Apparatus, of which the following is a full, clear, and exact specification.

The present disinfecting apparatus consists of a box open at one end, which through a sieve placed inside is divided into a chamber and an open mouthpiece. The chamber serves to receive the disinfecting medium. The mouthpiece is so constructed that by means of the same the box or capsule can be put or screwed on or placed inside of tube, funnel, or cup shaped attach-pieces of receptacles or on thus-shaped receptacles themselves and be easily removed without the possibility of disinfecting-gases escaping into the air after the putting or screwing on.

Figure 1:
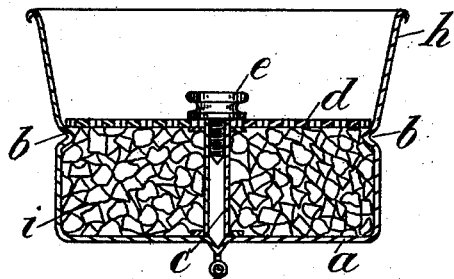
Figure 2:
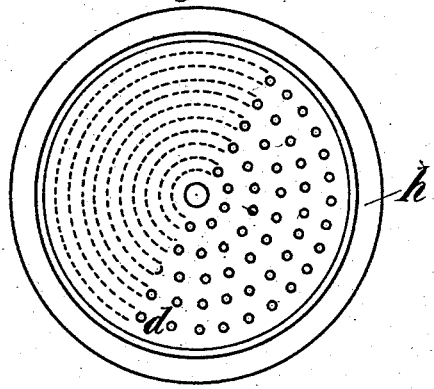

On the accompanying drawings, Figure 1 is a section through the apparatus on the line $x\ x$ of Fig. 2. Fig. 2 is a top view of the apparatus. Figs. 3 to 7 show the apparatus in different forms of applications and constructions.

Similar letters refer to similar parts throughout the several views.

The apparatus consists of a box $a$, made of one piece, which is provided at a suitable height with a depression $b$ on the outside. In the center of the bottom of the box is fixed the socket or tube $c$, provided with a flange at its upper end, which, together with the depression $b$, forms a prop or support for the sieve $d$, placed across the box. The sieve $d$ is secured in its position by a screw $e$, screwing into the tube $b$. The space of the box $a$ below the sieve $d$ is filled with the disinfecting medium to be employed. The present apparatus is suited for disinfecting mediums in a solid form—for instance, in the form of grains or tablets. With the apparatus shown in the drawings the space below the sieve is filled with a disinfecting material in the form of grains. On the evaporation of this mass the disinfecting-gases are developed. The mouthpiece $h$ of the box $a$ extends sufficiently far above the sieve $d$ that the box can be put to a proportionately considerable depth over the tube, funnel, cup, or otherwise shaped opening of the receptacle to be disinfected. The mouthpiece $h$ is for this reason suitably of a conical shape, so that on its being placed over the receptacle a sufficiently secure hold, and thereby a tight closure of the receptacle to be disinfected, is attained.

Figure 3:
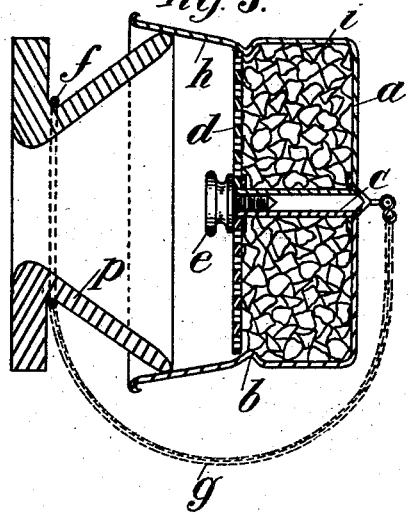

In Fig. 3 there is illustrated the application of the apparatus for the disinfection of telephone-mouthpieces. For this purpose, necessitating a frequent putting on and taking off, the apparatus is suitably fixed to the telephone by a chain $g$, attached to the bottom of the box $a$, and a ring $f$ around the mouthpiece $p$, so that the apparatus on being taken off remains in a certain connection with the telephone, and it will thus be an easy matter to put the apparatus over the telephone when the same has been used. When the telephone is not in use, the apparatus is placed with its mouthpiece $h$ over the mouthpiece $p$ of the telephone. The disinfecting-gases emanating from the lower part of the box are forced to enter into the mouthpiece of the telephone, so that any disease-producing or other germs are destroyed or made innocuous.

Figs. 4 and 5 show the apparatus applied to a receptacle $l$, serving to disinfect medical instruments or other objects. The mouthpiece $h$ of the box $a$ is in Fig. 4 tube-shaped and provided on the inside with a thread by means of which the apparatus can be screwed onto the tube-shaped attach-piece on the lid of the receptacle. In Fig. 5 the mouthpiece $h$ of the box $a$ has a conical shape and fits tightly inside the funnel-shaped attach-piece $n$ of the receptacle $l$.

The apparatus can also, as illustrated in Figs. 6 and 7, be affixed to the door or any other part of a cabinet $r$ and either in the form of construction shown in Fig. 1 or the forms shown in Figs. 4 and 5. The cabinet $r$ may likewise be used for disinfecting medical instruments or other objects. According to the size of the cabinet two or more apparatus are required.

The apparatus represented in Figs. 4 to 7 can also be filled with a suitable sterilizing medium, so that the receptacle $l$, Figs. 4 and 5, and the cabinet $r$, Figs. 6 and 7, could be used for the sterilization of comestibles and other substances.

What I claim as my invention, and desire to secure by Letters Patent of the United States, is—

In a disinfecting apparatus the combination with a box $a$ adapted to contain the disinfecting medium and provided with a mouthpiece $h$, an inner projection $b$ and a central support $c$, of a sieve $d$ resting on the projection and the support and means for securing the sieve on the support, substantially as and for the purpose set forth.

In witness whereof I have hereunto set my hand in presence of two witnesses.

PERCY SIMUNDT.

Witnesses:
HENRY HASPER,
WOLDEMAR HAUPT.